Patented Mar. 2, 1954

2,671,081

UNITED STATES PATENT OFFICE 2,671,081

HALF-CHROMED AZO DYE

Orman B. Billings, Wilmington, Del., and William R. Remington, Carneys Point, N. J., assignors to E. I. du Pont de Nemours & Company, Wilmington, Del., a corporation of Delaware No Drawing. Application June 29, 1950, Serial No. 171,254

3 Claims. (Cl. 260—151)

This invention relates to a new class of azo dyestuffs. More particularly, this invention relates to a new class of blue chromed azo dyes for nylon and wool, and the process for their manufacture.

Broadly, it is the object of this invention to supply a line of azo dyes for nylon, wool, and nylon-wool mixtures. It is a further object to supply a class of chromed azo dyes whose members as single dyes or as mixtures with other chromed azo dyes possess the following properties: (1) good light fastness; (2) good build-up; (3) applicability from a neutral bath which permits their use on mixed fabrics containing acid-sensitive components; (4) good wash fastness; and (5) an extended shade range; i. e., it should be possible by using the dyes singly or in mixtures to produce a very wide range of shades. It is a further specific object of this invention to produce a half-metallized, unsulfonated monazo blue dye which has the properties (1) (2) (3) and (4) above and which, when mixed with certain other known half-metallized, unsulfonated monoazo dyes developed for nylon, makes the production of satisfactory black dyeings on nylon possible.

These objects are realized by the half-chromed azo dye which in its anionic form has the formula:

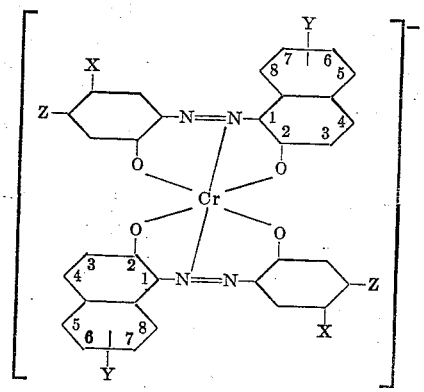

wherein X=OCH₃, OC₂H₅; Y and Z equal H, SO₂NH₂, SO₂NHCH₃, and SO₂NHC₂H₅ and wherein Y is located in a beta (6 or 7) position.

The products of this invention are unsulfonated half-chromed monoazo dyes. They build up very well from a neutral bath and can be used in mixtures with other half-metallized unsulfonated monazo dyes. When dyed on nylon or wool, all yield blue shades of excellent fastness-to-washing and -light.

Their outstanding merit is the fact that they are more bathochromic than any other known useful dyes of this structural type. That is, they have much less reddish and more greenish shades of blue than does any useful previously known half-metallized unsulfonated monazo dye.

As a result of their bathochromicity, good build-up and compatibility with other dyes of this class, they can be dyed in combination with known dyes of the unsulfonated half-metallized monoazo type to yield jet black dyeings on nylon. Black dyeings so produced, by using one of the dyes of this invention preferably mixed with 4-nitro - 2 - aminophenol→acetoacetanilide, Co/2 (yellow) and 4-nitro-2-aminophenol→beta-naphthol, Cr/2 (brown) are two to three times as fast to light as the fastest previously known black dyes for nylon.

This class of azo dyestuffs may be prepared by chroming the monazo dye base of the formula:

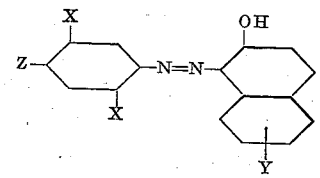

wherein X equals OCH₃, OC₂H₅; Y and Z equal H, SO₂NH₂, SO₂NHCH₃, SO₂NHC₂H₅, and wherein Y is located in a beta position on the ring indicated. Such chroming may be performed with an agent yielding chromium preferably in the presence of ethylene glycol, formamide or acetamide at a temperature between about 135° C. to 160° C.

This method of preparation makes available the metallized dyes of the type described without the necessity of using o-aminophenol derivatives as diazos. Two advantages accrue: firstly, the 2,5-dialkoxyanilines are much more readily available than are the 2-hydroxy-5-alkoxy-anilines. 2,5-dimethoxy and diethoxyaniline are manufactured regularly for use as dye intermediates and the sulfonamide derivatives can be prepared from them; secondly, the coupling step is accomplished more easily, since the o-alkoxy diazos couple much more strongly than do the o-hydroxy diazos.

The surprising feature of the process of preparation is that one methoxy group is cleaved while the other remains unaffected. In no previous instance has this reaction been described for a dye containing two alkoxy groups in one ring and treated in a fashion to form a metal complex through the cleavage of the alkoxy group adjacent to the azo structure.

The following examples are given to illustrate the invention. Parts are given by weight, unless otherwise specified.

Example 1

2,5-dimethoxyaniline was diazotized and coupled to 2-naphthol according to the process described in Example 1 of U. S. Patent 2,224,904 (Elley and Daudt, 1940). The product was dried and ground to a fine powder.

The dye base (350 grams) prepared in this manner was added to five liters of ethylene glycol containing 240 grams of chromium acetate [$Cr(C_2H_3O_2)_3 \cdot H_2O$]. The mixture was stirred and heated to 140–160° C. while it was maintained slightly alkaline as indicated by testing with Brilliant Yellow paper. This required the addition of about 60 grams of NaOH, added as a 30% solution in water. The mixture was stirred and maintained within the above-mentioned temperature range until the dye had been converted completely into the chromium derivative. This required about eight hours. The product was isolated by pouring the reaction mixture into about fifteen liters of water containing about 300 grams of NaCl. The chromed dye precipitated and was filtered and dried, yielding a deep blue powder which dyed nylon and wool blue from neutral aqueous bath. Such dyeings were found to be very fast-to-light and-wet processing.

Half-chromed azo dyes were prepared in a similar manner from the following components:

| Example | Diazo Component | Coupling Component |
|---|---|---|
| 2 | 2,5-Dimethoxyaniline | 2-Naphthol-6-Sulfonamide. |
| 3 | ....do.... | 2-Naphthol-6-N-Methyl Sulfonamide. |
| 4 | ....do.... | 2-Naphthol-7-Sulfonamide. |
| 5 | 2,5-DMA*-4-Sulfonamide. | 2-Naphthol. |
| 6 | 2,5-DMA*-4-N-Methyl Sulfonamide. | Do. |
| 7 | ....do.... | 2-Naphthol-6-N-Methyl Sulfonamide. |
| 8 | 2,5-DMA*-4-N-Ethyl Sulfonamide. | 2-Naphthol. |
| 9 | 2,5-Diethoxyaniline | Do. |

*DMA=dimethoxyaniline.

The chromed dyes of Examples 2 to 9 inclusive, yield fast blue dyeings on wool and nylon when applied from a neutral or mildly acidic bath.

The 2-naphthol-6-sulfonamide (of Example 2) was prepared according to the procedure described by Simon, Aromatic Hydroxysulfamides, 1942, Off. Pub. Bd. Report PB-656. The other naphthol sulfonamides were prepared by obvious modifications of this procedure except that p-toluenesulfonchloride was used in place of benzenesulfonchloride and 28% aqueous ammonia was used in place of ammonium carbonate.

The preparation of 2,5-dimethoxyaniline-4-N-methylsulfonamide (of Examples 6 and 7) was as follows: A mixture of 143 g. of 2,5-dimethoxyaniline and 86 ml. of glacial acetic acid was stirred at 40–50° C. while 120 ml. of acetic anhydride was added over a period of one hour. The mixture was stirred at 50–60° C. for one and one-half hours and then 1120 g. of chlorosulfonic acid was added over a period of two hours at 60–70° C. The mixture was stirred overnight at room temperature and then was poured onto a large amount of crushed ice and filtered.

The solid so obtained was added at 15–25° C. to 400 ml. of water which was saturated with monomethylamine. The mixture was stirred overnight at room temperature and filtered. The solid was heated at 80–85° C. with 600 ml. of 4N hydrochloric acid until solution was effected. This required about one-half hour. Decolorizing charcoal was added and the mixture was filtered. The filtrate was cooled to 0° C. and rendered slightly alkaline by the addition of 28% aqueous ammonia solution. The product was isolated by filtration.

Example 10

A dye which exhibited identical dyeing and fastness properties with those of Example 7 and which probably did contain the same anion resulted when the monazo dye 2,5-dimethoxyaniline-4-N-methylsulfonamide coupled to 2-naphthol-6-N-methylsulfonamide (12.5 g.) was heated to 130–140° C. for 14 hours with 10 g. of chromium acetate in 150 g. of acetamide. The mixture was poured into 200 ml. of water and the metallized dye precipitated upon the addition of salt and sufficient aqueous hydrochloric acid to bring the solution to pH 3.5±0.5.

Example 11

4-methoxy-2-aminophenol (4.5 g.) was dissolved in 100 ml. of water containing 4 ml. of 10N hydrochloric acid and the mixture was cooled to 0–2° C. by the addition of ice. The mixture was stirred at this temperature during the addition of 5.5 ml. of 5N sodium nitrite solution over a period of 10 minutes. The resulting solution of diazotized 4-methoxy-2-aminophenol was added to a solution of 8 g. of 2-naphthol, 2.4 g. sodium hydroxide and 8 g. of sodium carbonate in 130 ml. of water at 0–1° C. The mixture was stirred at this temperature overnight by which time coupling was almost complete and then was filtered. The moist filter cake was added to 320 ml. of formamide containing 8 g. of $$Cr(C_2H_3O_2)_3 \cdot H_2O$$

and the mixture was heated to 120–130° C. for one hour, by which time the dye had been converted entirely to the chromium complex. The chromed product was caused to precipitate by pouring the mixture into one liter of water containing 20 g. of NaCl. The dye was filtered and dried and exhibited the same dyeing properties as did the dye prepared according to Example 1.

We claim:

1. The half-chromed azo dye which in its anionic form has the formula:

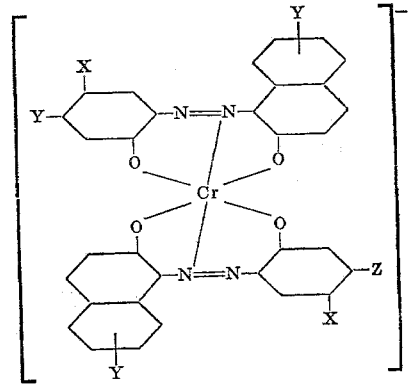

wherein X is selected from the group consisting of $OCH_3$ and $OC_2H_5$; Y and Z are selected from the group consisting of H, SO₂NH₂, SO₂NHCH₃ and SO₂NHC₂H₅; and wherein Y is located in a beta position of the ring indicated.

2. The half-chromed azo dye which in its anionic form has the formula:

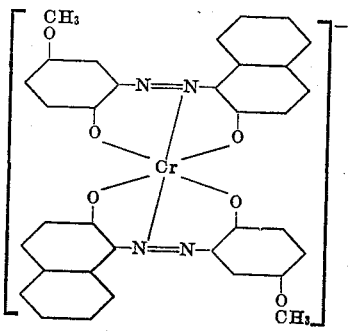

3. The method of producing a blue half-chromed azo dye for nylon and wool and mixtures thereof which comprises heating together, at a temperature of from 120 to 160° C., under slightly alkaline conditions and in the presence of an organic solvent from the class consisting of ethylene glycol, formamide and acetamide, an agent yielding chromium and the monazo dye base of the formula:

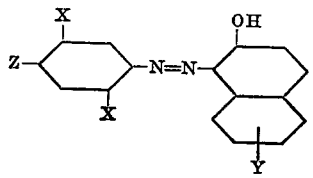

wherein X is selected from the group consisting of OCH₃ and OC₂H₅; Y and Z are selected from the group consisting of H, SO₂NH₂, SO₂NHCH₃ and SO₂NHC₂H₅; and wherein Y is in a beta position of the ring indicated.

ORMAN B. BILLINGS.
WILLIAM R. REMINGTON.

References Cited in the file of this patent

UNITED STATES PATENTS

| Number | Name | Date |
|---|---|---|
| 2,135,433 | Delfs et al. | Nov. 1, 1938 |
| 2,224,904 | Elley et al. | Dec. 17, 1940 |
| 2,396,327 | Kvalnes et al. | Mar. 12, 1946 |
| 2,534,197 | Grimmel et al. | Dec. 12, 1950 |

OTHER REFERENCES

Drew et al.: "Structure of the Chromium Lakes of Dyes," Journal Chemical Soc.; Part I, 1939, pages 823, 824 and 826.